United States Patent
Rasoul et al.

(10) Patent No.: US 9,868,814 B2
(45) Date of Patent: Jan. 16, 2018

(54) BRANCHED LOW PROFILE ADDITIVES AND METHODS OF PRODUCTION

(75) Inventors: Husam A. A. Rasoul, Plain City, OH (US); Dejan D. Andjelkovic, Dublin, OH (US); Dennis H. Fisher, Westerville, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 13/162,843

(22) Filed: Jun. 17, 2011

(65) Prior Publication Data

US 2011/0245393 A1    Oct. 6, 2011

Related U.S. Application Data

(62) Division of application No. 12/151,897, filed on May 9, 2008.

(51) Int. Cl.
*C08G 63/20*    (2006.01)
*C08L 63/00*    (2006.01)
*C08L 67/08*    (2006.01)

(52) U.S. Cl.
CPC .............. *C08G 63/20* (2013.01); *C08L 63/00* (2013.01); *C08L 67/08* (2013.01)

(58) Field of Classification Search
CPC ...... C08L 2666/14; C08L 67/08; C08L 67/00; C08G 63/20
See application file for complete search history.

(56) References Cited

U.S. PATENT DOCUMENTS

| | | | | |
|---|---|---|---|---|
| 3,986,992 A * | 10/1976 | Canning et al. | ............... | 523/514 |
| 4,172,059 A * | 10/1979 | Atkins | ................... | C08K 5/09 523/500 |
| 4,251,641 A * | 2/1981 | Arakawa | ................ | C08G 63/54 525/34 |
| 4,329,438 A * | 5/1982 | Yamori et al. | ................... | 525/64 |
| 4,383,060 A * | 5/1983 | Dearlove | ............... | C08G 59/38 523/429 |
| 4,472,544 A * | 9/1984 | Ochsenbein et al. | ......... | 523/511 |
| 4,673,706 A * | 6/1987 | Atkins | ............... | C08F 299/0478 525/111 |
| 5,116,917 A * | 5/1992 | Chang et al. | ................... | 525/407 |
| 5,254,642 A * | 10/1993 | Chang et al. | ................... | 525/438 |
| 5,504,151 A * | 4/1996 | Fisher et al. | .................... | 525/49 |
| 5,552,478 A * | 9/1996 | Fisher | ............... | 525/41 |
| 5,561,192 A * | 10/1996 | Lee et al. | ........................ | 525/19 |
| 5,756,554 A * | 5/1998 | Fisher | ................. | C08G 63/916 521/48.5 |
| 6,222,005 B1 * | 4/2001 | Loza et al. | ................. | 528/295.5 |
| 6,759,466 B2 * | 7/2004 | Steinhausler | ......... | C08F 283/01 524/426 |
| 6,803,389 B2 * | 10/2004 | Kawamura et al. | ........... | 521/48 |
| 2006/0178456 A1 * | 8/2006 | Seats et al. | ................... | 523/500 |
| 2006/0249869 A1 * | 11/2006 | Sumner | ................... | B29C 70/50 264/166 |
| 2008/0090954 A1 * | 4/2008 | Sumner et al. | ............... | 524/500 |
| 2008/0154002 A1 * | 6/2008 | Nava et al. | ................... | 526/236 |
| 2009/0029134 A1 * | 1/2009 | Grigo | ......................... | C08J 5/18 428/220 |
| 2009/0281230 A1 * | 11/2009 | Rasoul et al. | ................ | 524/523 |
| 2011/0040004 A1 * | 2/2011 | Andjelkovic | ........ | C08K 5/0008 524/394 |
| 2011/0245393 A1 * | 10/2011 | Rasoul et al. | ................ | 524/271 |

FOREIGN PATENT DOCUMENTS

EP       0075765 A1 *    4/1983

OTHER PUBLICATIONS

"Citric acid monohydrate". Obtained on Sep. 21, 2012 at http://sigmaladrich.com. No Author, No Date.*
"Soybean oil". Obtained on Sep. 21, 2012 at http://sigmaladrich.com. No Author, No Date.*
EPON Resin 828 Technical Data Sheet. No Author, No Date. Obtained online from http://www.hexion.com/Products/ShowTechnicalDataSheet.aspx?id=3942&Rev=7/16/2012%203:59:05%20AM on Mar. 27, 2017.*

* cited by examiner

*Primary Examiner* — Michael A Salvitti
(74) *Attorney, Agent, or Firm* — Thompson Hine LLP; William J. Davis

(57)    ABSTRACT

The invention pertains to low profile additives ("LPA") comprising branched polymers having a weight average molecular weight (Mw) of at least about 20,000 grams/mole and a number average molecular weight (Mn) of at least about 3,000 grams/mole and methods for making the LPAs. The invention further concerns compositions comprising LPAs synthesized from one or more difunctional monomers and one or more branching agents. Also, disclosed are thermosettable resinous compositions and molded articles comprising the LPAs.

18 Claims, No Drawings

BRANCHED LOW PROFILE ADDITIVES AND METHODS OF PRODUCTION

CROSS-REFERENCE TO RELATED APPLICATIONS

This application is a divisional application of U.S. patent application Ser. No. 12/151,897, filed May 9, 2008, presently pending, which is incorporated herein by reference.

BACKGROUND OF THE INVENTION

Field of the Invention

The invention relates to low profile additives ("LPAs") comprising branched polymers and methods for making the LPAs. The invention further concerns thermosettable resinous compositions, e.g., sheet molding compound ("SMC") and bulk molding compounds ("BMC"), comprising the LPAs.

The Related Art

Polyester resins and vinyl ester resins may be used for thermosetting resin materials. Thermosetting unsaturated polyester resins are generally prepared by reacting dicarboxylic acids and anhydrides with glycols. Thermosetting vinyl ester resins are typically the reaction product of about equal amounts of a polyepoxide and an unsaturated monocarboxylic acid. When applied to thermosetting compositions, polyester and vinyl ester resins may be used in combination with fibrous reinforcement and inert fillers to manufacture composite structures, such as SMC and BMC. Such composite structures may be made by pre-mixing the resin, filler, fibrous reinforcement, and other additives to form the molding compound. For SMC, in particular, the resin, filler, initiator, and other additives can be mixed to form a paste, which is then sandwiched between two rolling polyethylene sheets, one of which is covered with chopped fiberglass reinforcements. Resinous paste wets the fiberglass and the whole mixture gets compacted while passing through a series of calendering rolls to form the SMC. BMC, on the other hand, is prepared by premixing resin, filler, and other additives to form a molding paste. Fibrous reinforcements are then added to the paste and mixed to form the BMC. The molding compound then can be formed into the desired shape and cured in a heated, matched metal die.

Chemical thickening of the relatively low viscosity liquid resin, e.g., with a Group II metal oxide or hydroxide and water, to form a high viscosity gel after the resin has been mixed with all other ingredients in the molding compound can be applied in the manufacture of SMC or BMC. This thickening or B-staging has several advantages. Unthickened molding compounds are sticky masses, which are difficult to handle. After B-staging, they are firm to very high viscosity solid-like gels whose surfaces are relatively dry, and may appear like leathery sheets, like in the case of SMC. In this form, the compound can be handled easily. During the molding operation, the molding compound flows within the die set to fill the die cavity. The increased viscosity of B-staged molding compounds inhibits segregation of the various components of the molding compound during flow and promotes compositional uniformity of the composite over the entire volume of the structure.

Thermosetting resins shrink in volume during 'cure'. This shrinkage can cause warpage, internal stress build-up, dimensional changes, and poor surface cosmetics when reinforced composite objects are made from these thermosetting resins. Thermoplastic additives, typically referred to as LPAs, are known to reduce 'cure shrinkage' and associated problems. There are several types of polymers that may be used as LPAs, including saturated polyesters, polystyrene, poly(methylmethacrylate), poly(vinylacetate), and the like. Saturated polyester LPAs are generally linear polymers made primarily from aliphatic dibasic acids or anhydrides, like adipic acid or succinic anhydride, and diols, such as ethylene glycol, propylene glycol, or diethylene glycol. Linear LPAs made with high levels of aromatic diacids, like various phthalic diacids and anhydrides, and mixtures of symmetrical and asymmetrical diols, as well as those prepared with the addition of trimellitic anhydride, are also disclosed in the art.

SUMMARY OF THE INVENTION

The LPAs of this invention are prepared by reacting one or more monomers, such as typical difunctional monomers like diacids and diols with one or more branching agents. For purposes of this specification and the appended claims, branching agents shall mean multifunctional molecules, which contain or generate functional groups capable of further reacting with themselves or difunctional monomers to cause branching. The branching agent may be generative type or non-generative type and can also be a complex molecule having both generative and non-generative functionalities, i.e. the generative/non-generative type. The branching agent may be combinations of these types.

Diepoxides are examples of a generative type of branching agent. Upon their reaction with diacid monomers generative type branching agents are incorporated into the polymer backbone with concomitant formation of hydroxyl groups. The hydroxyl groups subsequently act as sites for branching through their reaction with any available carboxylic acid groups. Generative type branching agents also include dianhydrides, such as ethylene glycol bis(trimellitic anhydride) or pyromellitic dianhydride. Upon their reaction with hydroxyl groups the dianhydrides are incorporated into the polymer structure with concomitant formation of carboxyl groups. Carboxyl groups thus formed act as sites for branching through their reaction with any available hydroxyl groups.

Non-generative branching agents are typically multifunctional molecules having functionality greater than two and include, but are not limited to, polyols (e.g. glycerol, trihydroxymethylol propane, pentaerythritol, etc.), polyacids (e.g. trimelitic acid), polyhydroxyacids (e.g. 2,2-bis(hydroxymethyl)propionic acid, malic acid, citric acid, tartaric acid, etc.) and the like. The generative/non-generative branching agents are structurally more complex molecules that combine features of generative and non-generative branching agents (e.g. glycidol, epoxidized fatty acids, trimellitic anhydride, and the like). The branched structure of polyester allows the formation of high molecular weight LPA at a lower solution viscosity. In addition, these branched polyester LPAs are more effective at reducing shrinkage caused by cure, and improving surface smoothness of the molded objects.

The method for making the branched LPAs comprises reacting one or more branching agents with one or more monomers, typical polyester monomers, to produce LPAs with high polydispersity and relatively high weight average molecular weight. The method of making the branched LPAs produce high weight average molecular weight LPAs at lower solution viscosity, as compared to their linear analogues. Among many advantages of the method is the ability to make branched LPAs in which the manufacturing cycle time is significantly reduced. In an example of the method, one or more generative branching agents are mixed with an esterification catalyst and monomers, such as both diacid and diol monomers, at the beginning of the reaction. The mixture is then heated, typically at temperatures of about 120° C. to about 230° C., and allowed to react, resulting in immediate and fast branching and molecular weight buildup. In another example, a branching agent selected from the group consisting of one or more non-generative type branching agent, one or more complex generative/non-generative type branching agent comprising both generative and non-generative functionalities, and combinations thereof, are mixed simultaneously with esterification catalysts, and monomers, such as both diacid and diol monomers, and allowed to react under the typical polyesterification conditions.

The branched LPAs may be used in molding compounds and molded articles. In embodiments of the invention the LPAs described herein, including those made by the methods described herein, can be combined with components of molding compounds such as resin, filler, fibrous reinforcement, and other additives and the like to form a compound, which can then be molded into parts. Preferred resins include unsaturated polyester resins, vinyl ester resins, and mixtures thereof. For example, SMC and BMC comprising the branched LPAs provide improved surface quality of molded articles made from such SMC and BMC.

DETAILED DESCRIPTION OF THE INVENTION

The branched LPAs made using branching agent have relatively high weight average molecular weight and relatively high polydispersity. The weight average molecular weight (Mw) of the LPA is generally at least about 20,000 g/mol, such as from about 20,000 g/mol to about 1,000,000 g/mol, and typically from about 50,000 g/mol to about 300,000 g/mol. The number average molecular weight (Mn) is generally at least about 3,000 g/mol, typically from about 3,000 g/mol to about 10,000 g/mol. The polydispersity of the branched LPAs is generally at least about 4, such as about 4 to about 100, typically from about 5 to about 50, and most preferably about 7 to about 40.

In an embodiment of the invention, the branched LPAs are branched polyester LPAs which can be made using saturated aliphatic and aromatic diacids and anhydrides thereof. Suitable aliphatic diacids include, for example, succinic acid, succinic anhydride, glutaric acid, adipic acid, pimelic acid, suberic acid, azelaic acid, sebacic acid, undecanedionic acid, dodecanedionic acid, cyclohexane dicarboxylic acid, and the like, and mixtures thereof. Dimer acids, such as UNIDYME® line of products from the Arizona Chemical Company, Jacksonville, Fla., U.S.A. can also be used. Suitable aromatic diacids include, for example, phthalic acid, phthallic anhydride, isophthalic acid, terephthalic acid, [[bisphenyl-4,4'-docarboxylic acid]] bisphenyl-4,4'-docarboxylic acid, diphenic acid, 2,6-naphthalene dicarboxylic acid, and the like, and mixtures thereof. Mixtures of aliphatic and aromatic diacids also can be used.

Glycols may be used in making the branched polyester LPAs and these include, for example, HO—$(CH_2)_n$—OH, where n is 2 to 10; HO—$(CH_2$—$CH_2$—O—$CH_2$—$CH_2)_n$—OH, where n is 1 to 10; HO—$(CH_2$—$CH(CH_3)$—O—$CH_2$—$CH(CH_3))_n$—OH, where n is 1 to 10. Cyclic and bicyclic glycols, such as, cyclohexane diol and isosorbide, can also be used. Specific glycols used in formulating the branched polyester LPAs include, for example, ethylene glycol, 1,2- and 1,3-propylene glycols, butanediol, hexane diol, 2-methyl-1,3-propanediol, neopentyl glycol, diethylene glycol, dipropylene glycol, 1,3-propanediol and the like, and combinations thereof. 1,3-propanediol (Bio-PDO) available from DuPont Tate & Lyle Bioproducts Co. LLC, such as that available under the trade name SUSTERRA™, may be used.

Branched polyester LPAs are made by reacting typical diacid and diol monomers with one or more branching agents, such as the generative type, non-generative type, and/or generative/non-generative type branching agents. The branching agents will have degree of functionality greater than or equal to two, that is comprises two or more functional groups. Branching agents can have one or more different types of functional groups incorporated into their structure. Such functional groups include, but are not limited to anhydride, hydroxy, carboxy, epoxy, and ester functional groups. Branching agents cause a branched polymer structure during the reaction. Branching agents useful for the invention include polyacids, polyols, epoxy resins, polyhydroxyacids, the mixtures thereof, and the like. Examples of such branching agents are: glycerol, pentaerythritol, trimethylolpropane, polyetherpolyols, polyester polyols, vegetable oil-based polyols and mixtures thereof; polyepoxides, typically aliphatic and/or aromatic polyepoxides, such as, polyglycidyl ethers of polyphenols, like bisphenol A, bisphenol-F, 1,1-bis(4-hydroxy phenyl)ethane, 1,1-bis(4-hydroxy phenyl)isobutane, and 1,5-dihydroxy naphthalene, modified epoxy resins with acrylate or urethane moieties, glycidylamine epoxy resins, novolac epoxy resins; commercial bisphenol epoxy resins, such as, EPON® 826 and EPON® 828 from Hexion Specialty Chemicals, Inc., Houston, Tex., U.S.A. ("Hexion") and epoxy resins D.E.R.™ 383, and D.E.R.™ 364, as well as commercial epoxy novolac resins, like D.E.N.™ 431, 438 and 439 from the Dow Chemical Company, Midland, Mich., U.S.A. ("Dow"); epoxidized vegetable oils, such as commercially available epoxidized soybean oil (PLAS-CHEK® 775) from Ferro Corp., Cleveland, Ohio, U.S.A. or VIKOFLEX® 7190 epoxidized linseed oil from Arkema Inc, Philadelphia, Pa., U.S.A., hydroxy-containing vegetable oils, such as castor oil, polyfunctional monomers containing more than one type of functional groups, such as glycidol, 2,2-bis-(hydroxymethyl)propionic acid, citric acid, malic acid, tartaric acid, and the like.

In embodiments, the LPA comprises about 0.1 mole % to about 10 mole % of branching agent, based on the amount of total monomers, as such amounts are generally used in making the LPA. Preferably, the branching agent is used in amounts ranging from about 1 mole % to about 5 mole % based on the total amount of monomers, typically about 1.5 mole % to about 4 mole % based on the total amount of monomers.

In making the LPA, generally, the temperature of esterification is maintained in the range of about 150° to about 230° C. and an esterification catalyst is used. Such catalysts are conventional and include, for example, titanium tetrachloride, zinc acetate, zinc oxide, stannous oxalate, dibutyl tin oxide, phosphoric acid and the like and combinations thereof. Conventional color stabilizers, e.g., trilauryl phosphite or the like, also can be included in the reaction mixture.

The LPAs may be incorporated into SMC and BMC. For example, unsaturated polyester resins are suitable for making molding compounds for use with the branched LPAs. U.S. Pat. No. 5,552,478 describes thermosetting unsaturated polyesters and processes for making them. This patent also describes solvents (ethylenically unsaturated compounds), other than styrene, that can be used, such as, for example, vinyl toluene, methacrylic esters, and the like, and mixtures thereof.

Additionally, the LPAs can be incorporated into the vinyl ester or unsaturated polyester composite compositions. Accordingly, suitable curing agents (e.g., peroxides, such as, for example tert-butyl peroxyperbenzoate), accelerating agents, and the like are incorporated. Reinforcement and inert additives and fillers such as glass, metal filings, and inorganic fillers such as sand or clay also are appropriate. Pigments, release agents, plasticizers, and the like also are used as is necessary, desirable, or convenient in conventional fashion. Further, one or more enhancers, such as those described in U.S. Pat. Nos. 5,504,151 and 6,617,394, may be incorporated to further improve the surface quality. The enhancer may be applied as an additive in formulating the composite composition or may be mixed with the LPA and this mixture is incorporated. Enhancers suitable for the invention include all those described in U.S. Pat. Nos. 5,504,151 and 6,617,394, for example tall oil fatty acid capped adipic acid diethylene glycol oligomers, octyl epoxy tallate (such as DRAPEX® 4.4 available from Chemtura Corporation, Middlebury, Conn., U.S.A.), epoxidized linseed oil (such as FLEXOL™ LOE available from the Dow Chemical Company, Midland, Mich., U.S.A.), tall oil fatty acid capped multi functional epoxy, fatty acid capped multi functional polyols like polyethylene glycol dilaurates and polyethylene glycol dioleates (such as ETHOX DL-9, ETHOX DO-9 and ETHOX DO-14 available from Ethox Chemicals, Greenville, S.C., U.S.A.) and combinations thereof, and the like.

Composite compositions include SMC and BMC comprising some or all of (a) one or more resin, such as unsaturated polyester resin, vinyl ester resin or mixtures thereof, (b) one or more branched LPAs, either separately or in a mixture with one or more conventional or other LPAs, such as polyvinyl acetate, polystyrene, polymethyl methacrylate and the like, (c) one or more unsaturated monomer copolymerizable with the unsaturated polyester or vinyl ester, (d) fillers, (e) reinforcing fiber, (f) other additives and catalysts, (g) enhancers and (h) inhibitors. The total amount of LPA solids in the formulation ranges from between about 5 to about 35 parts per 100 weight parts of thermoset mixture, i.e. resin, the LPA(s), and the unsaturated monomer. The total amount of LPA in the composite composition is comprised of from about 1% to 100% of the branched LPA by weight of the total amount of LPA, and in embodiments where the composite composition comprises other LPA(s) in addition to the branched LPA, the amount of the other LPA(s) is up to about 99% by weight of the total amount of LPA, typically about 1% to about 99%. The SMC and or BMC, or other material comprising the LPA, may be used to make molded articles, such as molded articles comprising the LPA disclosed herein.

The LPAs described herein having the higher molecular weights provide for a more efficient additive and generally exhibit better shrinkage control and higher quality cosmetic surface when formulated with resins. The LPAs also exhibit better physical properties.

The following examples show how the present invention has been practiced, but should not be construed as limiting. In this application, all percentages and proportions are by weight and all units are in the U.S. system, unless otherwise expressly indicated. Also, all citations, including all patents and published patent applications referenced in this specification are expressly incorporated in their entirety herein by reference.

Examples 1 Through 4

The following raw materials, as set forth in Table 1, were charged to a three-liter resin kettle equipped with a thermocouple, mechanical stirrer, a fractionating column, distillation head, a condenser, and a nitrogen sparge to make branched LPAs.

TABLE 1

| Example | Component | Grams | Moles | Mole-% |
|---|---|---|---|---|
| 1 | Ethylene glycol | 421.05 | 6.78 | 25.40 |
|  | Propylene glycol | 521.40 | 6.85 | 25.66 |
|  | Adipic acid | 1837.80 | 12.58 | 47.09 |
|  | EPON 828 Resin* | 187.25 | 0.49 | 1.85 |
| 2 | Diethylene glycol | 149.00 | 1.40 | 7.40 |
|  | Ethylene glycol | 417.40 | 6.72 | 35.50 |
|  | PPG 410 | 366.60 | 1.21 | 6.39 |
|  | EPON 828 Resin* | 60.00 | 0.16 | 0.85 |
|  | Adipic acid Stage I | 1,379.20 | 9.44 | 49.86 |
| 3 | Ethylene glycol | 209.60 |  |  |
|  | Propylene glycol | 490.77 |  |  |
|  | NPG | 180.10 |  |  |
|  | EPON 828 Resin* | 60.00 |  |  |
|  | Adipic acid Stage II | 292.00 |  |  |
| 4 | Isophthalic Acid | 1182 g |  |  |
|  | Ethylene glycol | 253.57 |  |  |
|  | Propylene glycol | 310.11 |  |  |
|  | Adipic acid | 1,201.92 |  |  |
|  | EPON 828 Resin* | 31.28 |  |  |

*EPON ® 828 difunctional bisphenol A/epichlorydrin derived liquid epoxy resin, epoxide eq. 185-192, viscosity @ 25° C. 110-150; Hexion Specialty Chemicals, Inc., Houston, TX The mixture in each example was heated slowly to 120° C. at which time about 2.0 g to 2.5 g of triphenyl phosphine and about 2.0 g to about 2.5 g of FASCAT® 4100 butylstannoic acid (CAS 2273-43-0, Arkema Inc, Philadelphia, Pa.) catalysts were added. The now homogeneous mixture was heated slowly to 215° C. removing water. The reaction mixture was sparged with nitrogen. The rate of sparge was maintained such that the distillation head temperature is kept at 100° C. throughout the removal of water. The acid number and viscosity of the resin was monitored during the reaction. When the acid value reached 11-13 and the viscosity of the polyester (C&P at 150° C.) was at 6.0 to 7.0 Poise, the reaction product was cooled and cut to 60% nonvolatiles solids in styrene and inhibited with 200 ppm tert-butylcatechol. Examples 1 and 4 were analyzed for molecular weight and polydispersity. The LPA of example 1 had a weight average molecular weight (Mw) of 82,000 g/mol, a number average molecular weight (Mn) of 4,200 g/mol and a polydispersity of 19.5. The LPA of example 4 had a weight average molecular weight (Mw) of 27,670 g/mol, a number average molecular weight (Mn) of 5,560 g/mol and a polydispersity of 5.0.

Example 5

SMC was formulated by conventional methods using the branched LPA prepared in accordance with Example 1. The following table, Table 2, shows SMC formulations using the branched LPA and the properties of molded panels comprising the SMC. The SMC sheet was made according to conventional methods using a 24 inch SMC machine. Panels (12"×12") were molded at 300° F. (150° C.) and 75 tons pressure for two minutes. Surface quality measurements using Ashland's Advance Laser Surface Analyzer are also shown in Table 2.

LPA was diluted with 1,136 grams of ST, inhibited with 0.768 grams of tert-butylcatechol (TBC) (85% solution in methanol) and 0.786 grams of hydroquinone (HQ) to give LPA resin with 70.5% nonvolatiles.

TABLE 2

| Formulation | A | B | C | D |
|---|---|---|---|---|
| UPE Resin AROPOL D 1691 (Ashland, Inc.) | 61.1 | 61.1 | 61.07 | 61.07 |
| Branched LPA (60% NV) | 20.5 | 29.3 | 10.06 | 20.5 |
| PVAc LPA (40.5% NV) | 0.00 | 0.00 | 17.28 | 0.0 |
| Styrene | 18.4 | 9.6 | 11.39 | 18.4 |
| Total | 100.0 | 100.0 | 100.00 | 100.00 |
| Filler (CaCO$_3$) | 200.0 | 200.0 | 200.00 | 200.00 |
| Enhancers | 0.00 | 0.00 | 4.00 | 4.00 |
| Wetting agent (BYK 9010, Byk Chemie) | 0.6 | 0.6 | 0.6 | 0.6 |
| Mod E (5% p-benzoquinone solution) | 0.2 | 0.2 | 0.2 | 0.2 |
| BHT (butylated hydroxyl toluene) | 0.02 | 0.02 | 0.02 | 0.02 |
| TBPB Initiator (tert-butyl peroxyperbenzoate) | 1.5 | 1.5 | 1.5 | 1.5 |
| Zn Stearate | 4.5 | 4.5 | 4.5 | 4.5 |
| Total weight A side | 306.8 | 306.8 | 310.8 | 310.8 |
| B-side (Mod M, Ashland Inc.) | 2.70 | 2.70 | 2.74 | 2.74 |
| 1" Glass % (1" hard chop glass, Owens Corning) | 27-28 | 27-28 | 27-28 | 27-28 |
| Surface quality | | | | |
| ALSA Ashland Index | 54.2 | 44.5 | 42.9 | 45.2 |
| ALSA DOI | 99.3 | 99.0 | 97.0 | 98.3 |
| ALSA OP | 8.8 | 9.0 | 8.9 | 8.9 |
| Expansion | 0.00065 | 0.00083 | 0.00096 | 0.0009 |

* Enhancing additives are Ashland Inc products such as those described in U.S. Pat. Nos. 5,504,151 and 6,617,394.

Example 6

Branched LPA containing component(s) that requires transesterification (digestion) was made with the following components as set forth in Table 3.

TABLE 3

| | EX. 6 | | |
|---|---|---|---|
| Component | g | mole | mole % |
| Ehylene Glycol | 341.37 | 5.50 | 23.78 |
| Propylene Glycol | 418.50 | 5.50 | 23.78 |
| Adipic Acid | 1607.54 | 11.00 | 47.55 |
| Soybean oil | 572.00 | 0.65 | 2.81 |
| Epon ® 828 Resin | 170.13 | 0.45 | 1.94 |
| Zinc Acetate | 1.33 | 0.006 | 0.03 |
| HQ | 0.30 | 0.003 | 0.01 |
| TPP | 2.93 | 0.011 | 0.05 |
| FASCAT 4100 | 3.03 | 0.015 | 0.06 |

The procedure for Example 6 was as follows. Ethylene glycol, propylene glycol, soybean oil, and zinc acetate were added to a 3 L reactor equipped with a Vigreux column and a water condenser. Reaction was heated to 190-200° C. and temperature maintained for two hours to allow transesterification of soybean oil. A portion of adipic acid was then added to the reactor and the temperature increased to 200° C. After about 100 g of water was removed, reaction temperature was lowered below 140° C. and EPON® 828 resin, triphenyl phosphine (TPP), and the rest of the adipic acid, were added to the reactor. Reaction was then permitted to proceed at 200° C. until the acid value of 10-13 and C/P viscosity of 6-7 Poise at 150° C. were reached. The polyester The polydispersity index of LPAs were evaluated using conventional gel permeation chromatography (GPC). Example 6 had a number average molecular weight of 5,680 g/mol, weight average molecular weight of 319,461 g/mol, and polydispersity index of 56.2.

Example 7

The following procedure describes the use of non-generative branching agent for the synthesis of a branched LPA of this invention. The following raw materials, as set forth in Table 4, were charged to a three-liter resin kettle equipped with a thermocouple, mechanical stirrer, a fractionating column, distillation head, a condenser, and a nitrogen sparge to make branched the LPA.

TABLE 4

| | EX. 7 | | |
|---|---|---|---|
| Component | g | mole | mole % |
| Ehylene Glycol | 420.82 | 6.78 | 24.42 |
| Propylene Glycol | 521.22 | 6.85 | 24.67 |
| Adipic Acid | 1968.44 | 13.47 | 48.52 |
| Glycerol | 60.17 | 0.65 | 2.34 |
| FASCAT 4100 | 2.51 | 0.012 | 0.04 |

All components listed in Table 4 were charged into the reactor and heated slowly to 215° C. with concomitant removal of water. After the overhead temperature dropped below 75-80° C., the fractionating column was removed and reaction mixture sparged with nitrogen. When the acid value reached 10-13 and the C/P viscosity at 175° C. reached 6-7

Poise, the reaction was cooled down below 80° C. and dissolved in styrene inhibited with 200 ppm of tert-butylcatechol to 60% nonvolatiles. The LPA of example 7 had a weight average molecular weight (Mw) of 41,809 g/mol, a number average molecular weight (Mn) of 5,282 g/mol and a polydispersity of 7.92.

Example 8

SMC was formulated by conventional methods using the branched LPA prepared in accordance with Example 7. The following table, Table 5, shows SMC formulations using the branched LPA and the properties of molded panels comprising the SMC. The SMC sheet was made according to conventional methods using a 24 inch SMC machine. Panels (12×12") were molded at 300° F. (150° C.) and 75 tons pressure for two minutes. Surface quality measurements using Ashland's Advance Laser Surface Analyzer are also shown in Table 5.

TABLE 5

| Formulation | A |
| --- | --- |
| UPE Resin AROPOL ™ D 1691 (Ashland, Inc.) | 61.1 |
| Branched LPA from EX. 7 (60% NV) | 29.3 |
| Styrene | 9.60 |
| Total | 100.0 |
| Filler (CaCO3) | 200.0 |
| Wetting agent (BYK 9010, Byk Chemie) | 0.6 |
| Mod E (5% p-benzoquinone solution) | 0.2 |
| BHT (butylated hydroxyl toluene) | 0.02 |
| TBPB Initiator (tert-butyl peroxyperbenzoate) | 1.5 |
| Zn Stearate | 4.5 |
| Total weight A side | 306.8 |
| B-side (Mod M, Ashland) | 2.70 |
| 1" Glass % (1" hard chop glass, Owens Corning) | 27-28 |
| Surface quality | |
| ALSA Ashland Index | 58.7 |
| ALSA DOI | 97.3 |
| ALSA OP | 8.4 |
| Expansion | 0.00060 |

Examples 9-14

Branched polyester LPAs containing reactants difficult to solubilize, such as terephthalic acid (t-PA), were synthesized in a two stage process. About 2,500 g of branched polyester LPA was prepared in each example. The compositions formulated in these examples are set forth in Tables 6 and 7.

TABLE 6

| Reactant | Ex. 9 Wt (g) | Ex. 10 Wt (g) | Ex. 11 Wt (g) | Ex. 12 Wt (g) | Ex. 13 Wt (g) |
| --- | --- | --- | --- | --- | --- |
| Stage 1 | | | | | |
| Ethylene glycol | 380.2 | 300.0 | 315.0 | 552.5 | 467.5 |
| Diethylene glycol | 650.1 | 526.8 | 526.8 | 856.05 | 724.35 |

TABLE 6-continued

| Reactant | Ex. 9 Wt (g) | Ex. 10 Wt (g) | Ex. 11 Wt (g) | Ex. 12 Wt (g) | Ex. 13 Wt (g) |
| --- | --- | --- | --- | --- | --- |
| t-PA | 974.6 | 781.4 | 781.4 | 1,269.78 | 1,074.43 |
| FASCAT ® 4201 | 2.5 | 2.0 | 2.0 | 3.25 | |
| Stage 2 | | | | | |
| Adipic Acid | 857.2 | 740.4 | 740.4 | 1,203.15 | 1,018.05 |
| Bis-A Epoxy | 125.0 | 60.0 | 120.0 | 162.5 | 137.5 |
| TPP | 2.5 | 2.0 | 2.1 | 3.5 | 3.0 |

TABLE 7

| Reactant | Ex. 14 Wt. (g) |
| --- | --- |
| Stage 1 | |
| Susterra ™ Propanediol (DuPont Tate&Lyle Bio Products Co. LLC) | 416.65 |
| Diethylene Glycol | 526.80 |
| t-Pa | 781.40 |
| FASCAT ® 4201 | 2.20 |
| Stage 2 | |
| Adipic Acid | 778.22 |
| Bis-A Epoxy | 100.00 |
| TPP | 2.20 |

Stage I t-PA and glycols raw materials were charged into a the three-liter resin kettle equipped with a thermocouple, mechanical stirrer, a fractionating column, distillation head, a condenser and a nitrogen sparge. The reaction mixture, a white milky dispersion of solid t-PA in glycol, was heated with stirring to 195° C. to 200° C. to facilitate dissolving the t-PA into the glycol. Water was removed through the distillation column and when the glycols and t-PA had reacted to form a low molecular weight, clear, liquid oligomer, Stage I was complete.

Stage II

The heat was turned off and the adipic acid and Epoxy were charged, reducing the reactor temperature to approximately 140° C. The TPP (triphenylphosphine) catalyst was charged and the reaction mixture was held at 135° C. to 145° C. to react the epoxy and acids. The homogeneous mixture was then heated slowly to 215° C., while removing water. The reaction mixture was sparged with nitrogen. The rate of sparge was maintained such that the distillation head temperature was kept at 100° C. throughout the removal of water. The acid number and viscosity of the resin was monitored during the reaction. When the acid value reached 10-13 and the cone and plate viscosity of the polyester was between 6 and 8 Poise at 175° C., heating and sparging were stopped. The reaction product was cooled down and cut to 60% nonvolatiles in styrene and inhibited with 100 ppm PBQ and 100 ppm tert-butylcatechol.

Comparative Example 15 and Example 16

SMC and molded panels were made with conventional LPA, ENVIREZ® 2431 from Ashland, Inc., Dublin, Ohio, U.S.A., (Comparative Example 15) and branched LPA (described in Example 10) prepared in accordance with the invention (Example 16). The LPAs were each combined with AROTRAN® 185 resin and conventional fillers and additives, including polyvinyl acetate to make SMC sheet according to the standard methods using 24 inch SMC machine. Panels (12"×12") were molded at 300° F. (150° C.) and 75 tons pressure for two minutes. The table shows the surface quality for molded panels from SMC formulations using ENVIREZ® 2431 LPA and branched polyester LPAs and measured by Ashland's Advanced Laser Surface Analyzer (ALSA).

TABLE 8

|  | EX. 15 | EX. 16 |
| --- | --- | --- |
| Molding Viscosity(MMcP) | 48.0 | 26.8 |
| ALSA Index | 53.9 | 45.1 |
| DOI | 84.7 | 97.3 |
| Orange Peel | 7.7 | 8.8 |

We claim:

1. A composition comprising:
   a) a resin selected from the group consisting of an unsaturated polyester resin, a vinyl ester resin, and mixtures thereof;
   b) one or more unsaturated monomers copolymerizable with the resin; and
   c) a low profile additive consisting of a branched polyester resin comprising the reaction product of i) one or more epoxide branching agents selected from the group consisting of a polyepoxide, an epoxidized vegetable oil, and combinations thereof, ii) one or more diols selected from the group consisting of HO—$(CH_2)_n$—OH wherein n is 2 to 10, a cyclic diol, a bicyclic diol, 1,2-propylene glycol, 2-methyl 1,3-propanediol, neopentyl glycol, diethylene glycol, dipropylene glycol, and combinations thereof, iii) one or more diacids or anhydrides thereof;
   wherein:
      at least one of the epoxide branching agents comprises three or more epoxide function groups; and
      the low profile additive comprises about 0.1 mole % to about 10 mole % of the epoxide branching agent.

2. The composition of claim 1 wherein the diacid or anhydride thereof is selected from the group consisting of a saturated aliphatic diacid or an anhydride thereof, an aromatic diacid or an anhydride thereof, and combinations thereof.

3. The composition of claim 2 wherein the saturated aliphatic diacid or an anhydride thereof is linear.

4. The composition of claim 2 wherein the saturated aliphatic diacid is selected from the group consisting of succinic acid, glutaric acid, adipic acid, pimelic acid, suberic acid, azelaic acid, sebacic acid, undecanedionic acid, dodecanedionic acid, cyclohexane dicarboxylic acid, a dinner acid, and combinations thereof.

5. The composition of claim 2 wherein the aromatic diacid is selected from the group consisting of phthalic acid, isophthalic acid, terephthalic acid, bisphenyl-4,4'-docarboxylic acid, diphenic acid, 2,6-naphthalene dicarboxylic acid, and combinations thereof.

6. The composition of claim 1 wherein the diol having the structure HO—$(CH_2)_n$—OH where n is 2 to 10 is selected from the group consisting of ethylene glycol, 1,3-propylene glycol, butanediol, hexane diol, and combinations thereof.

7. The composition of claim 1 wherein the polyepoxide is selected from the group consisting of a polyglycidyl ether of a polyphenol, a modified epoxy resin with acrylate or urethane moieties, a glycidylamine epoxy resin, a novolac epoxy resin, and combinations thereof.

8. The composition of claim 7 wherein the polyglycidyl ether of a polyphenol is selected from the group consisting of bisphenol A, bisphenol-F, 1,1-bis(4-hydroxy phenyl) ethane, 1,1-bis(4-hydroxy phenyl) isobutene, and combinations thereof.

9. The composition of claim 1 wherein the epoxidized vegetable oil is selected from the group consisting of epoxidized soybean oil and epoxidized linseed oil.

10. The composition of claim 1 wherein the low profile additive comprises about 1 mole % to about 5 mole % of the branching agent.

11. A composite material comprising the composition of claim 1.

12. The composite material of claim 11 further wherein the amount of low profile additive is between about 5 to about 35 parts solid per 100 weight parts of the total amount of resin, the low profile additive and the unsaturated monomer.

13. The composite material of claim 11 further comprising another low profile additive selected from the group consisting of polyvinyl acetate, polystyrene, polymethyl methacrylate, and combinations thereof.

14. The composite material of claim 11 further comprising one or more enhancers selected from the group consisting of tall oil fatty acid capped adipic acid diethylene glycol oligomers, octyl epoxy tallate, epoxidized linseed oil, tall oil fatty acid capped multi functional epoxy, fatty acid capped multi functional polyols, and combinations thereof.

15. A molded article comprising the composite material of claim 11.

16. The composition of claim 1 wherein the cyclic diol is cyclohexane diol.

17. The composition of claim 1 wherein the bicyclic diol is isosorbide.

18. The composition of claim 1 wherein the branched polyester resin further comprises at least one branching agent selected from the group consisting of a polyacid, glycerol, pentaerythritol, trimethylolpropane, a polyester polyol, a vegetable oil-based polyol, a hydroxy-containing vegetable oils, a polyfunctional monomer containing more than one type of functional group, a soybean oil, and combinations thereof.

* * * * *